United States Patent [19]

Bennetsen et al.

[11] 4,054,245
[45] Oct. 18, 1977

[54] TIMER CONTROLLED SPACE THERMOSTAT WITH BATTERY OPERATED TIMER

[75] Inventors: Wayne J. Bennetsen, St. Louis, Mo.; Robert C. Krump, Waterloo, Ill.

[73] Assignee: Emerson Electric Co., St. Louis, Mo.

[21] Appl. No.: 730,795

[22] Filed: Oct. 8, 1976

[51] Int. Cl.² .................... G05D 23/00; H02J 7/00
[52] U.S. Cl. ................................. 236/47; 307/66; 165/12; 337/303
[58] Field of Search ............ 236/46 R, 47, 46 E; 165/12; 62/157; 307/66; 337/301, 303

[56] References Cited

U.S. PATENT DOCUMENTS

| | | | |
|---|---|---|---|
| 3,214,670 | 10/1965 | Schaf | 307/66 X |
| 3,948,441 | 4/1976 | Perkins et al. | 307/66 X |

Primary Examiner—William E. Wayner
Attorney, Agent, or Firm—Paul A. Becker, Sr.

[57] ABSTRACT

A timer controlled space thermostat includes a timer movement energized by a rechargeable battery. A first timer operated switch is in circuit with temperature responsive switching means and space conditioning apparatus control means and is operative to alternately control operation of the space conditioning apparatus control means at one and then the other of two different levels of temperature. A second timer operated switch is in circuit with the space conditioning apparatus control means and with circuit means for recharging the battery and is cyclically actuated to an open position to ensure complete de-energization of the space conditioning apparatus control means and to a closed position to enable the battery to be recharged.

8 Claims, 5 Drawing Figures

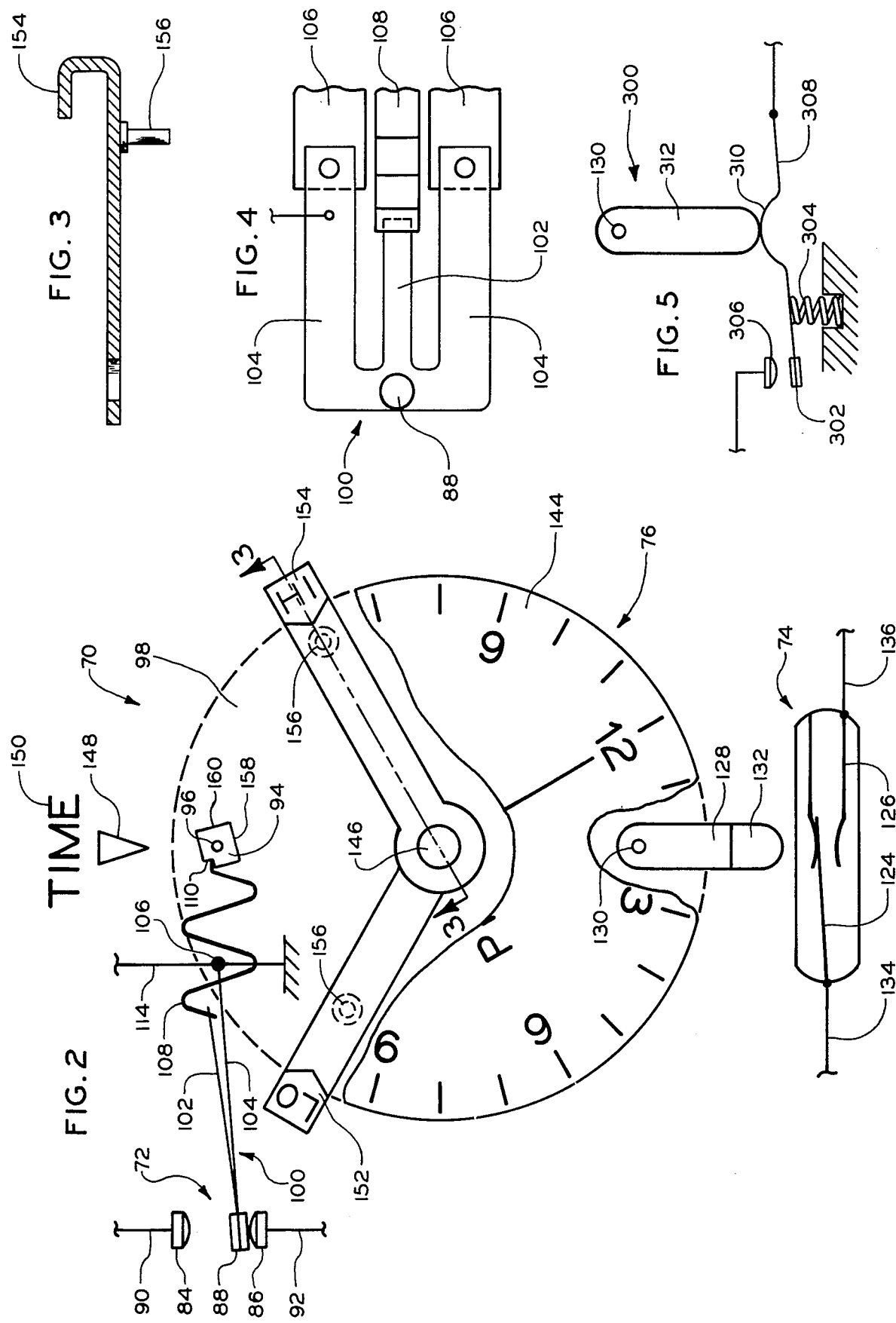

TIMER CONTROLLED SPACE THERMOSTAT WITH BATTERY OPERATED TIMER

This invention relates to timer controlled space thermostats for automatically changing the temperature level at which a controlled space is to be maintained, from one preselected level to another at preselected clock settings, and particularly to a timer controlled space thermostat wherein the electrical power to operate the timer is provided by a rechargeable storage battery and wherein the thermostat includes circuit means for recharging the battery.

Application Ser. No. 660,624, filed Feb. 23, 1976, for "TIMER CONTROLLED SPACE THERMOSTAT WITH BATTERY OPERATED TIMER" by Wilard J. Iberg, et al., assignors to the assignee of the present invention, discloses a timer controlled space thermostat adapted for replacement of a conventional space thermostat, such replacement requiring no additional wiring or components. The referenced timer controlled space thermostat includes an electrically operated timer, a rechargeable storage battery to provide the electrical power to operate the timer, two temperature responsive switches for controlling operation of space conditioning apparatus control means, a single-pole, double-throw timer operated switch to alternately complete a circuit through one and then the other of the temperature responsive switches for controlling the energizing of the space conditioning apparatus control means, and a recharging circuit connected to the battery.

While the referenced thermostat, illustrated therein as a thermostat for controlling both heating and cooling systems, performs quite satisfactorily during operation of the cooling system, a problem is encountered during operation of the heating system, the problem being that the heating system controller sometimes remains energized after the controlling temperature responsive switch in the thermostat has been satisfied. This problem appears to exist only when the heating system controller is an electromagnetically operated device, such as a solenoid or relay operated gas valve, and even then, the problem does not exist with all electromagnetically operated devices. Nor does the problem exist when the heating system controller is a thermo-electrically operated device, such as a conventional bimetal operated gas valve wherein the valve is moved to its opening position by a bimetal which is responsive to heat from a heater coil associated with the bimetal.

It is believed that the occasional failure of some electromagnetically operated gas valves to close is due to the fact that, in the referenced application, the gas valve is constantly connected to the power source. More specifically, in the referenced application, when the system selector switch is in the "HEAT" position, the heating system controller is connected to the secondary winding of a transformer through a parallel circuit, one branch being the battery recharging circuit comprising a charging resistor and diode, and the other branch comprising the two temperature responsive switches, the timer operated switch, and a heating anticipation resistor. When the temperature responsive switches are in a satisfied position, the battery is recharged through the resistor and diode branch circuit. The rectified current flow is quite small, such as approximately 5 milliamperes. While this small rectified current flow is much too small to effect pull-in of a typical solenoid or relay operated gas valve, such valves generally requiring approximately 200 to 400 milliamperes to effect pull-in, it is believed that the recharging circuit current and voltage is effective to prevent the magnetic force, which exists when the valve is energized, from decaying to the level to which it must decay to enable the valve to drop out. It is believed that this prevention of the decay of magnetic force, combined with varying construction parameters such as the magnetic characteristics of the iron in the magnetic circuit and the spring return forces on the solenoid plunger or relay armature, cause the valve to occasionally stick open.

It should be noted that while some of the existing solenoid and relay operated gas valves in existing installations would stick open as described above, there are others that would not. However, since the referenced thermostat is intended as a simple replacement for existing conventional space thermostats without requiring additional wiring or additional components, such as a different gas valve, it is considered essential that the problem be solved within the circuitry of the thermostat. It should also be noted that while the high temperature limit switch, in the referenced application, will function to prevent an unsafe condition whenever the gas valve remains open, such a condition is obviously unacceptable in that the desired temperature levels are not maintained.

It has been determined that the aforementioned problem, the valve remaining energized through the recharging circuit after the thermostat is satisfied, can be overcome by interrupting the recharging circuit for a sufficient period of time to enable the magnetic forces to decay. It has been further determined that this time period should preferably be at least 40 milliseconds.

An object of the present invention, therefore, is to provide an improved timer controlled space thermostat including battery operated electrical timing means, circuit means operative to recharge the battery, and control circuit means including temperature responsive switching means operative to control the operation of space conditioning apparatus control means, the timing means including switching means operative to ensure complete de-energization of the space conditioning apparatus control means subsequent to the movement of the temperature responsive switching means from its demand position.

In a preferred embodiment of the invention, a timer controlled space thermostat includes two single-throw temperature switches adjustable to respond to two different levels of temperature, a battery operated timer, and circuit means for recharging the battery. Connected in parallel with the recharging circuit means is control circuit means including the temperature responsive switches and a first timer actuated switch operative to alternately complete a circuit through one and then the other of the temperature responsive switches and thereby to control the operation of space conditioning apparatus control means. The timer further includes a second switch in the recharging circuit means operative when its contacts are closed and when the controlling temperature responsive switch is in its satisfied position to enable said battery to be recharged, and operative when its contacts are open and when the controlling temperature responsive switch is in its satisfied position to de-energize the space conditioning apparatus control means in the event that de-energization did not occur when the controlling temperature responsive switch moved from its demand position. The second timer actuated switch is preferably actuated to its open position once every minute and is maintained open for several seconds.

Other objects and advantages of the invention will become apparent from the following description when read in connection with the accompanying drawings.

In the drawings:

FIG. 2 is a fragmentary front view of the timer in FIG. 1;

FIG. 3 is a cross-sectional view of a switch actuator arm taken on line 3—3 of FIG. 2;

FIG. 4 is a plan view of the switch blade utilized in the timer operated switch; and FIG. 5 is a fragmentary front view of an alternate switch for use in the timer of FIG. 2.

DESCRIPTION OF THE PREFERRED EMBODIMENT

Figure 1:
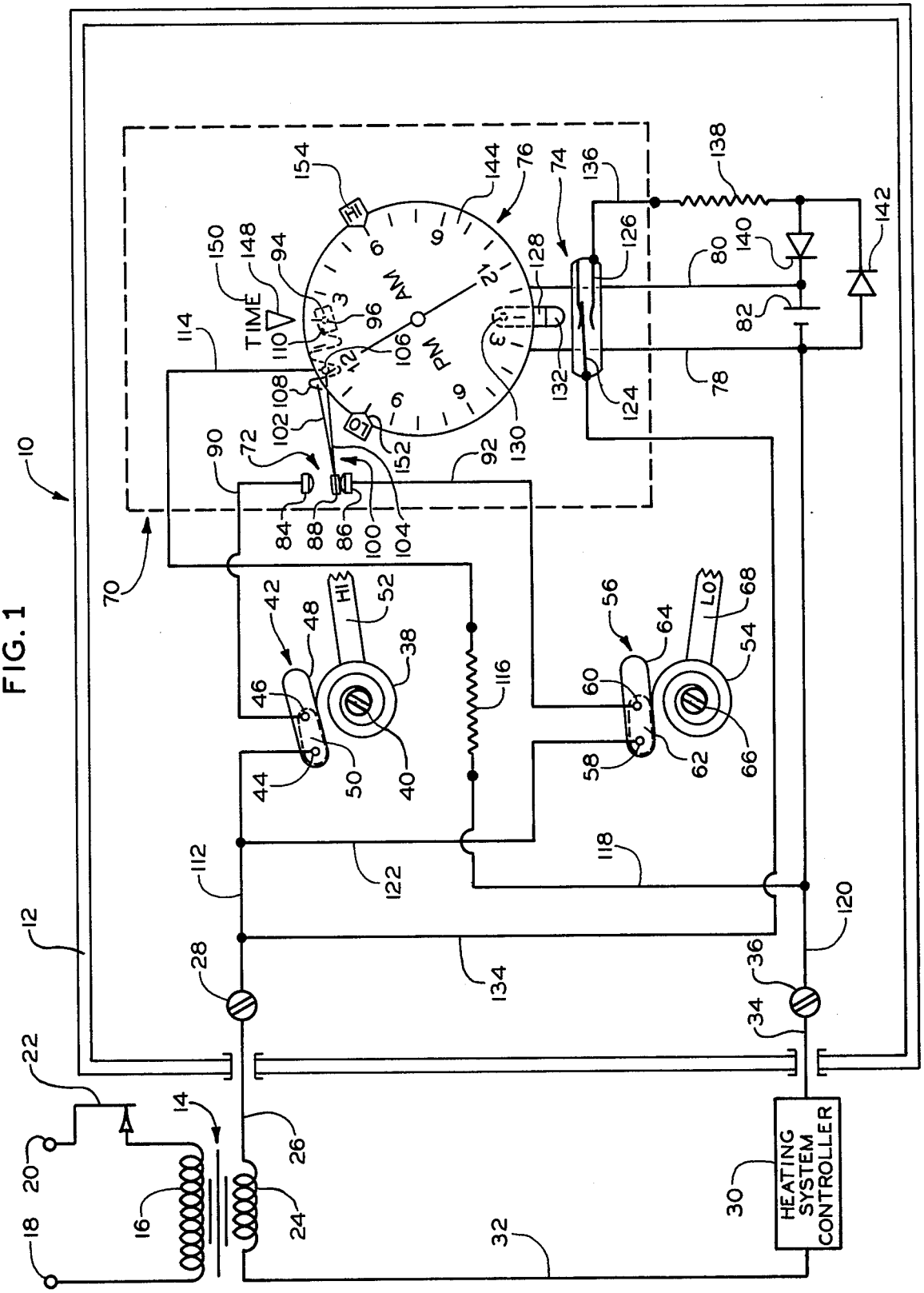
FIG. 1 is a dragrammatic illustration of a timer controlled space thermostat constructed in accordance with the present invention and shown in conjunction with control means for a heating system.

Although the following description is directed towards a heating system, it is to be understood that the teachings of this invention are also applicable to a cooling system and to a heating/cooling system.

Referring to FIG. 1, a timer controlled space thermostat for controlling the temperature in a conditioned space is generally indicated at 10 and includes a housing 12. A voltage step-down transformer 14 has its primary winding 16 connected across terminals 18 and 20 of a conventional 120-volt alternating current power source through a high temperature limit switch 22. The contacts in the limit switch 22 are normally closed, opening only in response to an abnormally high temperature in the plenum of a furnace (not shown) to effect the de-energization of transformer 14.

One side of the transformer secondary winding 24 is connected by a lead 26 to a screw terminal 28 secured in housing 12. A heating system controller 30, is connected by a lead 32 to the other side of secondary winding 24, and by a lead 34 to a screw terminal 36 secured in housing 12.

The heating system controller 30 can be of any conventional means, such as a gas valve solenoid winding, for controlling the energization of conventional heating apparatus such as a forced warm air furnace. It is to be understood that the above-described circuitry external to the thermostat housing 12 is conventional circuitry utilized for a conventional heating space thermostat.

The inner end of a spirally wound bimetal strip 38 is rigidly attached to a first rotatably adjustable mounting shaft 40. Attached to the free end of bimetal strip 38 is a first single-throw mercury switch 42 having electrodes 44 and 46 which are sealed inside a glass bulb 48 along with a blob of mercury 50. Bimetal 38 is wound so as to cause bulb 48 to tilt counterclockwise in response to a decrease in ambient temperature. The mercury 50 is effective to electrically connect electrodes 44 and 46 when the bulb 48 is tilted sufficiently in a counterclockwise direction and to disconnect electrodes 44 and 46 when the bulb 48 is tilted sufficiently in a clockwise direction. A first temperature adjustment arm 52, for manually setting the higher of two desired space temperatures to be maintained, has its inner end press fitted on the shaft 40 so that the shaft 40 and the arm 52 rotate together. The outer end of adjustment arm 52 is designated "HI" and extends externally from the housing 12 for cooperation with a graduated temperature scale (not shown).

Attached in a similar manner to the free end of a second bimetal strip 54 is a second single-throw mercury switch 56 comprising electrodes 58 and 60 and a blob of mercury 62 sealed in a glass bulb 64. Bimetal 54 is wound so as to cause bulb 64 to tilt counterclockwise in response to a decrease in ambient temperature. The inner end of bimetal strip 54 is attached to a second rotatably adjustable mounting shaft 66. Attached in a similar manner to the second mounting shaft 66 is a second temperature adjustment arm 68, having its outer end designated "LO," for manually setting the lower of the two desired space temperatures to be maintained. Although for purposes of illustration the mounting shafts 40 and 66 are shown as being mounted to housing 12 in spaced relationship with each other, it is to be understood that they are coaxially mounted so as to minimize the overall length and width of the housing 12 and to simplify the application of equal quantities of anticipation heat to bimetals 38 and 54. The coaxial mounting, for the purposes of the present invention, can be of any suitable construction, the only requirement being that adjustment arms 52 and 68 are adjustable relative to each other.

A timer, indicated generally at 70 in FIGS. 1 and 2, includes a single-pole, double-throw switch 72 and a reed switch 74. The timer 70 further includes a 24 hour electrically operated clock 76 connected by leads 78 and 80 to a small storage battery or batteries 82 for energization thereof. The battery 82 is of the rechargeable type, such as nickle-cadmium, and is connected in a recharging circuit as will be hereinafter described. The clock 76 may have any suitable electrically operated movement capable of keeping time accurately, of providing sufficient torque to operate the timer switches 72 and 74, and one that consumes only a small amount of electrical energy. By way of example, a suitable clock movement comprises an integrated electronic circuit and a fixed frequency element, such as a quartz crystal.

Switch 72 includes fixed contacts 84 and 86 and a movable contact 88. Fixed contact 84 is connected by a lead 90 to electrode 46 of mercury switch 42 and fixed contact 86 is connected by a lead 92 to electrode 60 of mercury switch 56. Switch 72 is a bistable, over-center, toggle switch actuated by rotational movement of a generally square-shaped member 94 pivotal on a shaft 96 mounted in a wall 98 of the timer case. Movable contact 88 is connected to the left end of a flat switch blade 100 having stable positions on either side of an instable center position. The switch blade 100, shown more clearly in FIG. 4, has a compression leg 102 joined at the left end to outer tension legs 104. The right end of outer tension legs 104 are anchored to a fixed point 106. A serpentine compression spring 108 is interposed between the right end of the center compression leg 102 and a V-shaped groove 110 in pivoted member 94. When member 94 is caused to rotate sufficiently clockwise above pivot 96 by means to be hereinafter described, switch 72 is actuated in a snap-action manner to the position shown wherein contacts 86 and 88 are closed. When pivoted member 94 is subsequently caused to rotate sufficiently counterclockwise, switch 72 is actuated to the position wherein contacts 84 and 88 are closed. The parameters, such as the composition and dimensions of blade 100 and spring 108, are such that the force required to actuate switch 72 from one bistable position to the other is extremely low.

When timer switch contacts 84 and 88 are closed, mercury switch 42 is effective to control the energization of the heating system controller 30, the circuit being: from transformer secondary winding 24, lead 26, terminal 28, a lead 112, mercury switch 42, lead 90, fixed contact 84, movable contact 88, switch blade 100, a lead 114, a conventional low resistance heating anticipation resistor 116, a lead 118, a lead 120, terminal 36, lead 34, heating system controller 30, and lead 32 back to transformer secondary winding 24. When timer switch contacts 86 and 88 are closed, mercury switch 56 is effective to control the energization of the heating system controller 30, the circuit being: transformer secondary winding 24, lead 26, terminal 28, lead 112, a lead 122, mercury switch 56, lead 92, fixed contact 86, movable contact 88, switch blade 100, lead 114, resistor 116, leads 118 and 120, terminal 36, lead 34, heating system controller 30, and lead 32 back to transformer secondary winding 24.

Reed switch 74 includes normally closed leaf spring contacts 124 and 126. Switch 74 is actuated by rotational movement of an actuator arm 128 connected at one end to a rotating shaft 130 extending outwardly from the timer movement through the timer wall 98. Actuator arm 128 includes a magnetic portion 132 at its other end. Shaft 130 is preferably rotated at a rate of one complete revolution per minute.

As the actuator arm 128 rotates towards switch 74, it reaches a position where the magnetic field produced by the magnetic portion 32 causes contacts 124 and 126 to open. Contacts 124 and 126 remain open, the position shown in FIG. 2, until the actuator arm 128 has subsequently rotated sufficiently to diminish the effect of the magnetic field produced by the magnetic portion 132. The duration of the time period during which contacts 124 and 126 are open is several seconds although 40 milliseconds is sufficient. It is to be understood that the time period during which contacts 124 and 126 are open can be varied by, for example, changing the dimensions of the magnetic portion 132 or by changing the rate of rotation of shaft 130.

Although switch 74 is illustrated as being actuated by actuator arm 128, it is to be understood that other actuating means could be utilized, such as a rotating gear within the timer 70 having a magnetic portion embedded in one or more gear teeth. Also, a switch and actuator arm construction other than that shown in FIG. 2 could be provided. For example, in FIG. 5, an alternate switch and actuator arm construction generally indicated at 300 includes a movable contact 302 biased by a compression spring 304 into contact with a fixed contact 306. Movable contact 302 is connected to a movable switch member 308 having a raised portion 310. An actuator arm 312 is connected at one end to the rotating shaft 130. As actuator arm 312 rotates and contacts the raised portion 310, switch member 308 is forced downwardly against the bias of spring 304 and contacts 302 and 306 are opened. When actuator arm 312 subsequently rotates past the raised portion 310, contacts 302 and 306 are closed by spring 304.

Referring to FIG. 1, when contacts 124 and 126 are closed, a recharging circuit for battery 82 is completed, the recharging circuit being in parallel with the circuit connections of the timer switch 72, mercury switches 42 and 56, and low resistance anticipation resistor 116. The recharging circuit comprises the transformer secondary winding 24, lead 26, terminal 28, lead 112, a lead 134, switch contacts 124 and 126, a lead 136, a resistor 138 of considerably higher resistance than resistor 116, a diode 140, battery 82, lead 120, terminal 36, lead 34, heating system controller 30, and lead 32 back to transformer secondary winding 24. A diode 142 is connected across battery 82 and diode 140 in opposed polarity to diode 140 for a reason to be hereinafter described.

Referring to FIG. 2, clock 76 includes a clock face 144 which is rotated in a counterclockwise direction by a drive shaft 146 and is pivoted with suitable time indicia covering a 24 hour period. Time is read by reference to an arrow 148 and the word "TIME" 150 fixed with respect to the rotating clock face 144. For example, in FIG. 1, the clock time is 2:00 a.m.

A pair of similarly constructed switch actuator arms 152 and 154 bearing the designations "LO" and "HI", respectively, are rotatably adjustable with respect to the clock face 144 and are movable therewith. Referring to FIG. 2 and 3, each of the switch actuator arms 152 and 154 is frictionally mounted at one end to clock shaft 146 for rotation therewith. A pin 156 is secured to the underside of switch actuator arms 152 and 154. Pin 156 is radially positioned on "LO" actuator arm 152 so that in 156 will contact a segment 158 of the square-shaped pivoted member 94 at a point below the shaft 96 as arm 152 is rotated with the clock face 144 in a counterclockwise direction. This action will cause member 94 to be rotated in a clockwise direction. When member 94 is rotated sufficiently clockwise, movable switch contact 88 is snapped into contact with fixed contact 86, this contact position being shown in FIG. 2. Because switch 72 is bistable, contacts 86 and 88 remain in contact after pin 156 has subsequently rotated past member 94.

Pin 156 is radially positioned on "HI" actuator arm 154 so that pin 156 will contact a segment 160 of the member 94 at a point above the shaft 96 as arm 154 is rotated with the clock face 144 in a counterclockwise direction. This will cause member 94 to be rotated in a counterclockwise direction causing movable contact 88 to be snapped out of contact with fixed contact 86 and into contact with fixed contact 84. Again, because switch 72 is bistable, contacts 84 and 88 remain in contact after pin 156 has subsequently rotated past member 94.

OPERATION

Referring to FIG. 1, in operation, temperature adjustment arm 52, identified as "HI," is adjusted to indicate on a graduated temperature scale (not shown) the higher of the two desired space temperatures to be maintained, and temperature adjustment arm 68, identified as "LO," is adjusted to indicate the lower of the two temperatures.

The timer switch actuator arm 152, marked "LO," is rotated on the clock face 144 to indicate the clock time at which the lower temperature time period is to commence. The actuator arm 154, marked "HI," is rotated on the clock face 144 to indicate the clock time at which the higher temperature time period is to commence. The operation of thermostat 10 will now be described for a condition wherein the lower temperature time period is to commence at 10:00 p.m. and the higher temperature time period is to commence at 6:00 a.m. Accordingly, "LO" actuator arm 152 is set at the 10:00 p.m. position on the clock face 144 and "HI" actuator arm 154 is set at the 6:00 a.m. position.

In FIG. 1, clock time is 2:00 a.m., and bimetal 38 has responded to a decrease in space temperature sufficient to cause tilting of mercury switch 42 and the connection of electrodes 44 and 46. This connection of electrodes 44 and 46 is ineffective, however, to cause energizing of the heating system controller 30 since fixed contact 84, connected to electrode 46, is open.

Because "LO" temperature adjustment arm 68 is set to a lower temperature setting than "HI" adjustment arm 52, it requires a greater decrease in ambient temperature for bimetal 54 to effect connection of electrodes 58 and 60 in mercury switch 56 than it does for bimetal 38 to effect connection of electrodes 44 and 46 in mercury switch 42. When electrodes 58 and 60 are connected by mercury 62, as shown in FIG. 1, the heating system controller 30 is then energized through the following circuit: transformer secondary winding 24, lead 26, terminal 28, leads 112 and 122, electrode 58, mercury 62, electrode 60, lead 92, fixed contact 86, movable contact 88, switch blade 100, lead 114, anticipation resistor 116, leads 118 and 120, terminal 36, lead 34, heating system controller 30, and lead 32 back to transformer secondary winding 24.

As previously described, rotating actuator arm 128 is effective to cause reed switch contacts 124 and 126 to open for several seconds each minute. When contacts 124 and 126 are open, the recharging circuit is broken. During the above time period when the heating system controller 30 is energized through mercury switch 56, the closing of contacts 124 and 126 causes the recharging circuit to be connected in parallel with the series connected mercury switch 56, timer switch 72, and anticipation resistor 116. Under these conditions, since the resistance of charging resistor 138 is considerably greater than the resistance of anticipation resistor 116, the recharging circuit is effectively shunted and no recharging of battery 82 occurs.

Bimetal 54 subsequently responds to an increase in ambient temperature by tilting mercury switch 56 clockwise. Upon sufficient tilting thereof, mercury 62 disconnects electrodes 58 and 60. If reed switch contacts 124 and 126 are open at the time electrodes 58 and 60 are disconnected, all current flow through the heating system controller 30 ceases since both the above described parallel circuits are then broken whereby the heating system controller 30 is completely de-energized. However, if reed switch contacts 124 and 126 are closed at the time electrodes 58 and 60 are disconnected, the current flow through the heating system controller 30 is not terminated but is reduced to the relatively small current flow required to recharge the battery through high resistance charging resistor 138. Should this small recharging current flow be sufficient to cause the heating system controller 30 to remain energized, the heating system controller 30 will remain energized until reed switch contacts 124 and 126 open. When reed switch contacts 124 and 126 open, the heating system controller 30 is completely de-energized since all current flow therethrough then ceases. Since reed switch contacts 124 and 126 are opened once every minute by the rotating actuator arm 128, the heating system controller 30 can remain energized by the small recharging current flow for only a short time.

When actuator arm 128 subsequently rotates past the position at which the magnetic field produced by magnetic portion 132 of actuator arm 128 is effective to hold contacts 124 and 126 open, contacts 124 and 126 close. The small recharging current again flows through the heating system controller 30. However, this small current is insufficient to cause the heating system controller 30 to become operative. That is to say, if the heating system controller 30 is a solenoid operated gas valve, for example, this small recharging current, while sometimes sufficient to hold in the valve once it is energized, is insufficient to pull in the valve from a completely de-energized condition.

Depending on the construction of the electrical portion of the heating system controller 30, sometimes the small recharging current causes an audible hum therein. Diode 142 is effective to eliminate or at least reduce this hum.

When bimetal 54 subsequently responds to a sufficient decrease in ambient temperature, electrodes 58 and 60 are again connected, causing the heating system controller 30 to again be energized. Therefore, with timer switch contacts 86 and 88 closed, operation of the heating system controller 30 is controlled in the above described manner by mercury switch 56, and reed switch 74 is effective to both ensure the complete de-energization of heating system controller 30 and to enable the recharging of battery 82 in the above described manner. Under these conditions, the lower of the two desired levels of space temperature, as determined by the setting of the "LO" temperature adjustment arm 68, is maintained.

When the clock 76 subsequently rotates counterclockwise to the position wherein the "HI" actuator arm 154 registers with the time indicator arrow 148, this occurring at 6:00 a.m., the pin 156 on the "HI" actuator arm 154 contacts the upper segment 160 of the pivoted member 94, causing member 94 to rotate counterclockwise on the shaft 96 and actuate the timer switch 72, switching movable contact 88 out of engagement with fixed contacts 86 and into engagement with fixed contact 84. Since electrode 60 in mercury switch 56 is connected to fixed contact 86, now open, mercury switch 56 is is no longer effective to control the energizing of heating system controller 30 and the control thereof is transferred to mercury switch 42.

After the above described timer switching has occurred, the connection of electrodes 44 and 46 by mercury 50 due to a sufficient decrease in ambient temperature sensed by bimetal 38 to tilt mercury switch 42 counterclockwise causes the heating system controller 30 to be energized through mercury switch 42 and timer switch contacts 84 and 88 instead of through mercury switch 56 and timer switch contacts 86 and 88, the circuit being: transformer secondary winding 24, lead 26, terminal 28, lead 112, electrode 44, mercury 50, electrode 46, lead 90, fixed contact 84, movable contact 88, switch blade 100, lead 114, heating anticipation resistor 116, leads 118 and 120, terminal 36, lead 34, heating system controller 30, and lead 32 back to the secondary winding 24.

When bimetal 38 subsequently responds to a sufficient increase in ambient temperature, electrodes 44 and 46 are disconnected and reed switch 74, in the same manner as previously described, is again effective to ensure the complete de-energization of heating system controller 30 and to enable the recharging of battery 82.

When bimetal 38 responds to a sufficient decrease in ambient temperature, electrodes 44 and 46 are again connected, energizing the heating system controller 30. Therefore, commencing at 6:00 a.m., at which the timer switch contacts 84 and 88 close, mercury switch 42 controls the operation of the heating system controller 30 to maintain the higher of the two desired levels of space temperature as determined by the setting of the "HI" temperature adjustment arm 52, and reed switch 74 ensures the complete de-energization of heating system controller 30 and enables the recharging of battery 82.

When clock 76 subsequently rotates counterclockwise to the position wherein the "LO" actuator arm 152 is in registry with the time indicator arrow 148, this occurring at 10:00 p.m., the pin 156 on the "LO" actuator arm 152 contacts the lower segment 158 of the member 94, causing it to rotate clockwise about the shaft 96 and actuate timer switch 72, switching movable contact 88 out of engagement with contact 84 and into engagement with contact 86. Therefore, from 10:00 p.m. until 6:00 a.m., at which time the "HI" actuator arm 154 is again effective to actuate switch 72, the lower of the two temperature levels will be maintained by mercury switch 56 in the manner previously described, and reed switch 74, in the same manner as previously described, is again effective to both ensure the complete de-energization of heating system controller 30 and to enable battery 82 to be recharged.

If there is a power interruption at terminals 18 and 20 or if the high temperature limit switch 22 opens its contacts during the above operation of the heating system, transformer 14 is de-energized. However, since the clock 76 is energized by the battery 82, the clock 76 remains energized so that clock time remains accurate.

Althrough operation of the system has been described in conjunction with reed switch 74 and its actuator arm 128, it is to be understood that the operation of the system utilizing the switch and actuator arm construction indicated at 300 in FIG. 5 would be essentially the same.

While a preferred embodiment of the present invention has been illustrated and described in detail in the drawings and foregoing description, it will be recognized that many changes and modifications will occur to those skilled in the art. It is therefore intended, by the appended claims, to cover any such changes and modifications as fall within the true spirit and scope of the invention.

We claim:

1. In a timer controlled space thermostat for controlling operation of electrically operated space conditioning apparatus control means,
   an alternating current power source;
   first circuit means connected across said power source through said space conditioning apparatus control means for energization thereof including temperature responsive switching means and a first timer operated switching means;
   an electrically operated timer movement;
   a rechargeable storage battery connected to said timer movement for energization thereof;
   second circuit means connected across said power source through said space conditioning apparatus control means for recharging said battery including a second timer operated switching means; and
   said second timer operated switching means being cyclically operative to ensure complete de-energization of said space conditioning apparatus control means and to effect recharging of said battery.

2. In a timer controlled space thermostat for controlling operation of electrically operated space conditioning apparatus control means,
   two temperature responsive switches arranged to be sequentially actuated in the same direction in response to a progressing space temperature change;
   an electrically operated timer movement;
   a rechargeable storage battery connected to said timer movement for energization thereof;
   first timer operated switching means including circuit means operative to alternately complete a control circuit extending through one and then the other of said switches for controlling operation of said space conditioning apparatus control means;
   circuit means for recharging said battery connected in parallel with said control circuit and including a second timer operated switching means; and
   said second timer operated switching means including a switch alternately operable to an open position to enable said space conditioning apparatus control means to be completely de-energized and to a closed position to enable said battery to be recharged.

3. In a timer controlled space thermostat for controlling operation of electrically operated space conditioning apparatus control means,
   an alternating current power source;
   two temperature responsive switches adjustable to respond to two different preselected levels of space temperature;
   each switch being actuated to a conductive position in response to space temperature change in one direction and being actuated to a non-conductive position in response to space temperature change in the opposite direction
   an electrically operated timer movement;
   a rechargeable storage battery connected to said timer movement for energization thereof;
   first timer operated switching means including circuit means operative to alternately complete an energizing circuit extending through one and then the other of said switches when their said conductive positions for connecting said space conditioning apparatus control means across said source for energization thereof;
   circuit means for recharging said battery connected in parallel with said energizing circuit and including a second timer operated switching means; and
   said second timer operated switching means including a switch alternately operable to an open position to de-energize said space conditioning apparatus control means in the event that de-energization does not occur when said energizing circuit is broken and to a closed position to enable said battery to be recharged when said energizing circuit is broken.

4. The space thermostat claimed in claim 3 wherein said timer movement includes a rotating member and said switch of said second timer operated switching means is actuated to its said open position by said rotating member and subsequently held in its said position for only a small portion of the time required for said rotating member to complete a full revolution.

5. The space thermostat claimed in claim 4 wherein said rotating member includes a magnetic portion and said switch of said second timer operated switching means is a reed switch.

6. The space thermostat claimed in claim 4 wherein said full revolution requires a time period of approximately one minute.

7. The space thermostat claimed in claim 3 wherein said charging circuit includes a resistor, a first diode, said battery, and a second diode, said second diode being connected in opposed polarity to said first diode across said first diode and said battery.

8. In a thermostat for controlling operation of electrically operated space conditioning apparatus control means wherein current from a power source is supplied to a first circuit means including temperature responsive switching means and timer operated switching means for controlling energization and de-energization of said space conditioning apparatus control means, wherein said timer includes an electrically operated timer movement, wherein a rechargeable storage battery is connected to said timer movement for energization thereof, wherein current from said power source is supplied to a recharging circuit connected to said battery, wherein said recharging circuit and said battery are electrically in parallel with said first circuit means, and wherein said battery recharging circuit is effective to recharge said battery only when said first circuit means is de-energized, the improvement comprising means for momentarily de-energizing said battery recharging circuit after said first circuit means is de-energized to ensure de-energization of said space conditioning apparatus control means.

* * * * *